United States Patent [19]
Bigot et al.

[11] Patent Number: 5,620,540
[45] Date of Patent: Apr. 15, 1997

[54] METHOD AND A MACHINE FOR MANUFACTURING A SHEATHED BUNDLE OF THREAD-LIKE ELEMENTS

[75] Inventors: Henri Bigot, Creteil; Michel Caure, Meulan, both of France

[73] Assignee: Plasto SA, Chenove, France

[21] Appl. No.: 424,466

[22] PCT Filed: Sep. 29, 1993

[86] PCT No.: PCT/FR93/00951

§ 371 Date: May 3, 1995

§ 102(e) Date: May 3, 1995

[87] PCT Pub. No.: WO95/09427

PCT Pub. Date: Apr. 6, 1995

[51] Int. Cl.⁶ .......................... H01B 13/00; B29C 63/06
[52] U.S. Cl. .................. 156/54; 156/55; 156/56; 156/196; 156/213; 156/308.4; 156/309.9; 156/433; 156/443; 156/477.1; 156/499; 174/71 R; 174/72 R
[58] Field of Search .................. 156/54, 55, 56, 156/296, 308.4, 308.6, 309.9, 213, 196, 499, 443, 475–476, 477.1, 433; 174/71 R, 72 R, 72 A

[56] References Cited

U.S. PATENT DOCUMENTS

| 3,080,892 | 3/1963 | Plummer | 156/55 X |
| 3,128,214 | 4/1964 | Lay . | |
| 4,566,502 | 1/1986 | Kellogg . | |

FOREIGN PATENT DOCUMENTS

| 991016 | 9/1951 | France | 156/55 |
| 2664850 | 1/1992 | France . | |
| 2802138 | 7/1979 | Germany . | |
| 3309348 | 9/1984 | Germany . | |

*Primary Examiner*—Jeff H. Aftergut
*Attorney, Agent, or Firm*—Sixbey, Friedman, Leedom & Ferguson, P.C.; Gerald J. Ferguson, Jr.; David S. Safran

[57] ABSTRACT

In the method and the machine for manufacturing a bundle (33) of thread-like elements such as tubes or electric cables of finite length and including at least one junction point for a branch, and in which the elements of the bundle are covered by a tape (31) of thermofusible insulating material wrapped transversely about the bundle with the longitudinal edges (31a, 31b) of the tape being united by welding, two rows each comprising a plurality of wheels (9 to 14) for driving the bundle (33) and the tape (31) are provided, the wheels pressing against the tape, a V-shape being previously imparted to the tape by a guide situated upstream from the wheels, said rows of wheels defining between them a through path (18) for the bundle, the path being upwardly open and passing successively beneath a first horizontal guide (23) for folding down one of the sides of the V-shape against the bundle, beneath a nozzle (36) for blowing hot air into the angle formed between the folded-down side (31a) and the non-folded-down side (31b) of the V-shape, and beneath a second horizontal guide (25) for folding the second side (31b) of the V-shape down onto the already-folded-down first side (31a).

12 Claims, 3 Drawing Sheets

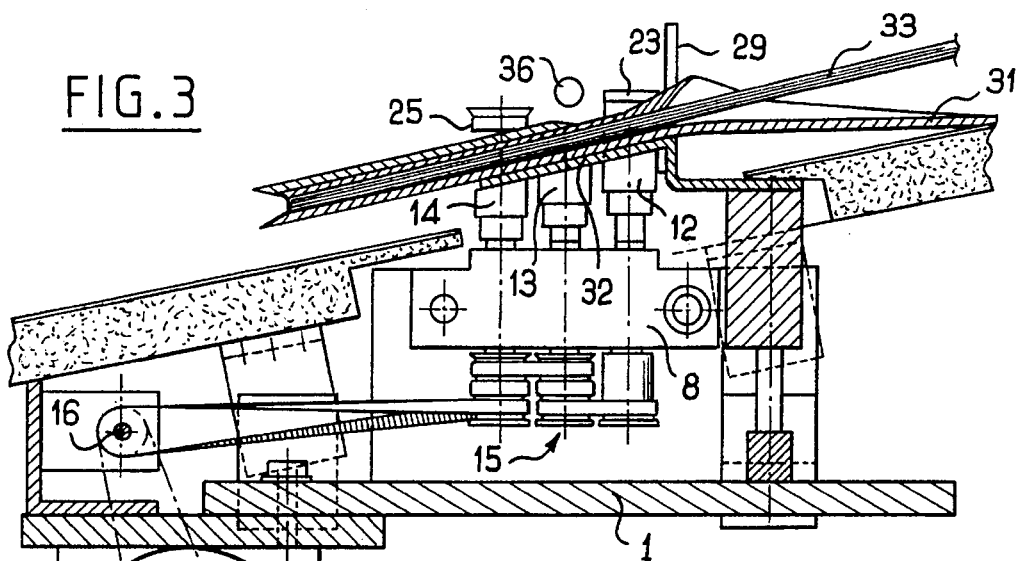
FIG.3
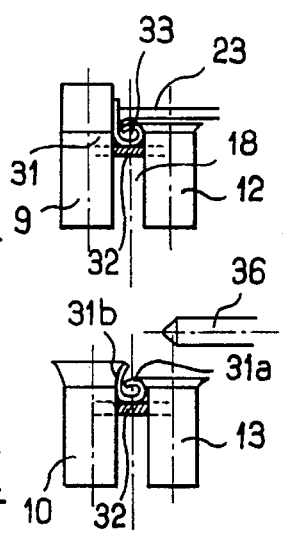
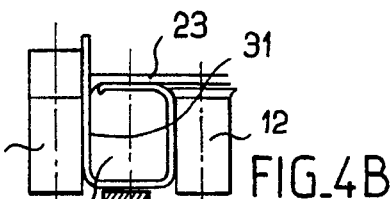
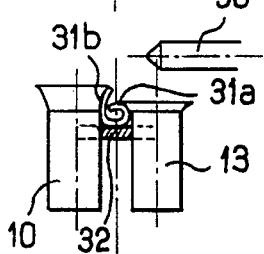
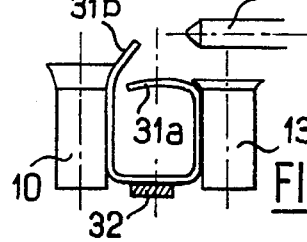
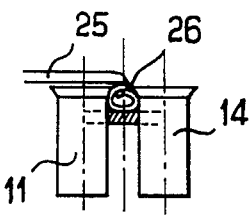
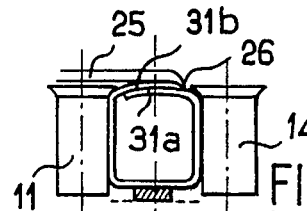
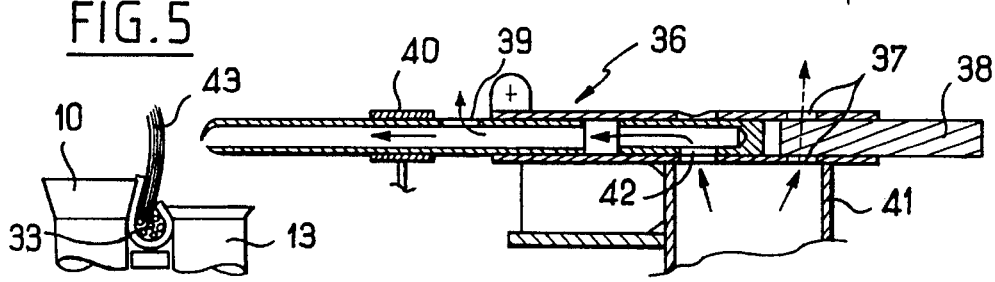

METHOD AND A MACHINE FOR MANUFACTURING A SHEATHED BUNDLE OF THREAD-LIKE ELEMENTS

The present invention relates to a method and to a machine for quickly and cheaply manufacturing a bundle of thread-like elements where the bundle includes at least one branch such as the harnesses of tubes or electric cables commonly to be found in motor vehicles.

In the motor industry, electrical wiring is generally performed by preparing one or more bundles of wires on an assembly jig, in holding the wires together by means of tape or of a split sheath of plastics material, and in covering the assembly with a polyurethane foam or with an adhesive baize structure.

The sheathing or taping has the essential function of imparting a certain amount of cohesion to the bundle so as to make it easy to install along the structure of a vehicle, and simultaneously it forms a flexible covering that absorbs vibration and damps shocks between the bundle and the bodywork, which shocks would otherwise generate noise.

Such bundles are generally built up manually, taking a large amount of time, and the materials used are poor at withstanding aging or the severe environmental conditions that exist in the engine compartment of a motor vehicle.

Several methods exist for making a sheath around a bundle of electric cables, and one of them consists in enclosing the bundle of cables in a tape by wrapping the tape transversely to itself around the bundle, and then uniting the two lateral edges of the tape. That method is used, in particular, for applying thermal insulation to pipework. The problem which is poorly solved by known apparatuses and methods is the problem of allowing branches of the bundle to pass through the sheath.

One way of overcoming this difficulty, that has been proposed in the past but that is not satisfactory, is to place a sheath on branching bundles by building up the bundles on a board having means for determining the shape of each of the wires making up the bundle; the board including sheet material that is cut out to the shape of the bundle and its branches; the wires being placed on the sheet in their final configuration; the entire structure being covered by the same sheet material cut out in similar manner; and the wires of the bundle being enclosed between these two cut-out sheets that are united along their edges by gluing, welding, or by any other means. That method is labor-intensive and does not provide a satisfactory technique for rapidly sheathing bundles that include branches.

The invention differs from prior techniques of sheathing a bundle of cables or tubes by the way in which the problem to be solved is taken into consideration. A bundle including branches can be considered as comprising a plurality of bundles that are to be combined, which bundles can be treated successively providing it is not necessary to close the sheath at the junction point of each branch. Accepting such imperfect sheathing goes against the prejudices of those concerned with sheathing and insulation, but for the special case of cable harnesses and the like in motor vehicles, sheathing is not there to protect the wires of a harness hermetically, but is essentially used for lagging purposes in order to avoid noise. Thus, accepting small imperfections in the sheathing of cable harnesses in motor vehicles does not have any undesirable consequences on the main technical effect that is desired.

Thus, in a first aspect, the present invention provides a method of manufacturing a bundle of thread-like elements such as tubes or electric cables of finite length, in which the bundle includes at least one junction point for a branch, and in which the thread-like elements of a branch are enveloped in a plane thermofusible insulating material that is wrapped transversely about the elements and that has its longitudinal edges united by welding.

According to the invention, when a bundle has a branch, each of the branches of the bundle is sheathed in succession by means of a respective tape that is wrapped transversely around the thread-like elements composing said branch, and the edges of the tape are united by welding except at the location of junction points between branches. A branching bundle sheathed in this way thus leaves uncovered the root of each branch on the parent branch from which it stems. This apparent imperfection in the sheathing has no harmful effects in particular on the sound-reducing qualities of the bundle made in this way. In contrast, the method implemented makes it possible to achieve a significant saving in the time and cost of sheathing operations, and also makes it possible to automate them.

In a particular implementation of the invention, the heat for welding is provided by blowing hot air against the outside face of one margin of the tape and against the inside face of the opposite margin while said margins are moving past the flow of hot air and while they are being held so as to form a groove, welding subsequently consisting in pressing one of the margins heated in this way against the other. The use of a hot air flow is advantageous when it comes to flexibility of implementation.

In the above implementation, it is preferable to regulate the heat applied by diverting an adjustable fraction of the flow of hot air that would otherwise be directed into the angle of the above-mentioned groove. This disposition makes it possible to use a source that produces heat at a constant rate and is thus easy, regular, and reliable in operation, with the heat required for welding thus being regulated independently of the operation of the primary source and being easily servo-controlled, e.g. to the speed at which the bundle and its sheath is moving through the flow of hot air.

When going past branching points, additional hot air flow is diverted, or the entire flow of hot air may be diverted.

In a second aspect, the present invention provides a machine for manufacturing a bundle of thread-like elements such as tubes or electric cables of finite length, the bundle including at least one junction point for a branch, and the elements of the bundle being covered in a tape of thermofusible insulating material wrapped transversely therearound with the longitudinal edges of the tape being united by welding, which machine includes a welding head comprising two rows each of a plurality of drive wheels for simultaneously driving the bundle and the tape, a V-shape previously being imparted to the tape by a guide situated upstream from said wheels, said rows of wheels defining between them a through path for the bundle, which path is upwardly open and passes successively beneath a first horizontal guide for folding down one of the sides of the V-shape against the bundle, beneath a nozzle for blowing hot air into the angle formed between the folded-down side and the non-folded-down side of the V-shape, and beneath a second horizontal guide for folding down the second side of the V-shape against the already folded-down first side. With this machine, it will be understood that the tubular sheath is formed by welding together the two overlapping opposite margins of a tape. In the context of the invention, such welding by means of hot air (which is known per se) has the advantage of being easy both to adjust and to servo-control firstly to the speed at which the bundle travels through the welding head, and secondly to the need to interrupt such welding when going past the junction points of branches that branch off from the branch that is being sheathed.

For the purpose of going past the junction points, the horizontal guides are retractable against a return member tending to maintain them in the operating position. Such retraction is performed in a plane parallel to the travel direction of the bundle.

Of the other characteristics of the invention, particular mention may be made of a characteristic relating to the hot air blast nozzle which includes a vent outlet upstream from its end overlying the travel path, and the through section of the vent outlet is adjustable as a function of the speed at which the bundle is driven by the wheels. The blast nozzle may include a second vent outlet whose through section is either opened or closed depending on whether a junction point of the bundle is present or absent on the travel path.

Other characteristics and advantages of the invention appear from the following description of an embodiment thereof.

Reference is made to the accompanying drawings, in which:

FIG. 3 is a section view on line III—III of FIG. 1 through the welding head of the machine of the invention in a variant embodiment thereof;

FIGS. 4A–4F are a diagram showing the method implemented for two different sizes of sheathed bundle; and FIG. 5 is a diagrammatic section view through a hot air blast nozzle implemented in the invention.

Figure 1:
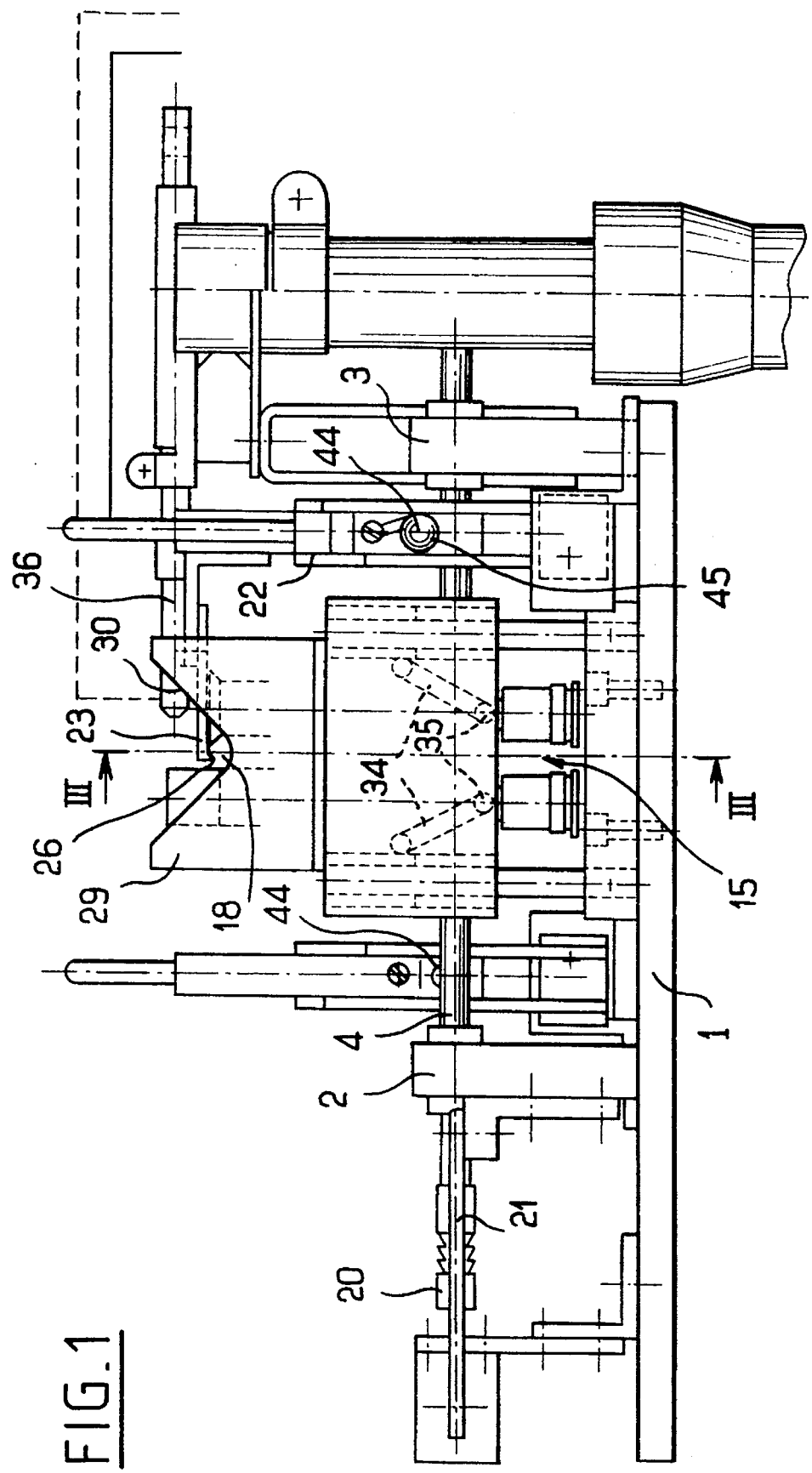
FIG. 1 is an elevation view of a machine of the invention.

In the figures, it can be seen that the machine comprises a stand 1 which may be constituted by a workbench, for example. The stand includes two vertical support elements 2 and 3 which slidably receive rods 4 and 5 that are parallel to each other and to the workbench, which rods are interconnected at one of their ends by means of a horizontal crossbar 6 whose midpoint is pivoted to the support element 2. The rods 4 and 5 form a support for two blocks 7 and 8, each block forming the support for a group of three roller wheels 9, 10, and 11 for the block 7, and 12, 13, and 14 for the block 8. The block 7 has one of its ends secured to the rod 4 while its other end is slidably mounted on the rod 5, whereas the block 8 is secured to the rod 5 and has its other end slidably mounted on the block 4. Beneath its bottom face, each block also supports drive pulleys for each of the sets of wheels carried thereby, said drive pulleys, referenced 15 in FIG. 3, are coupled together by means of belts, and they are coupled to a drive shaft 16 which is itself coupled to drive means 17 disposed beneath the stand 1. The shaft 16 is parallel to the rods 4 and 5 so that the belt which connects it to the sets of pulleys 15 of the blocks can slide along said shaft 16 when the blocks move along the rods 4 and 5.

Figure 2:
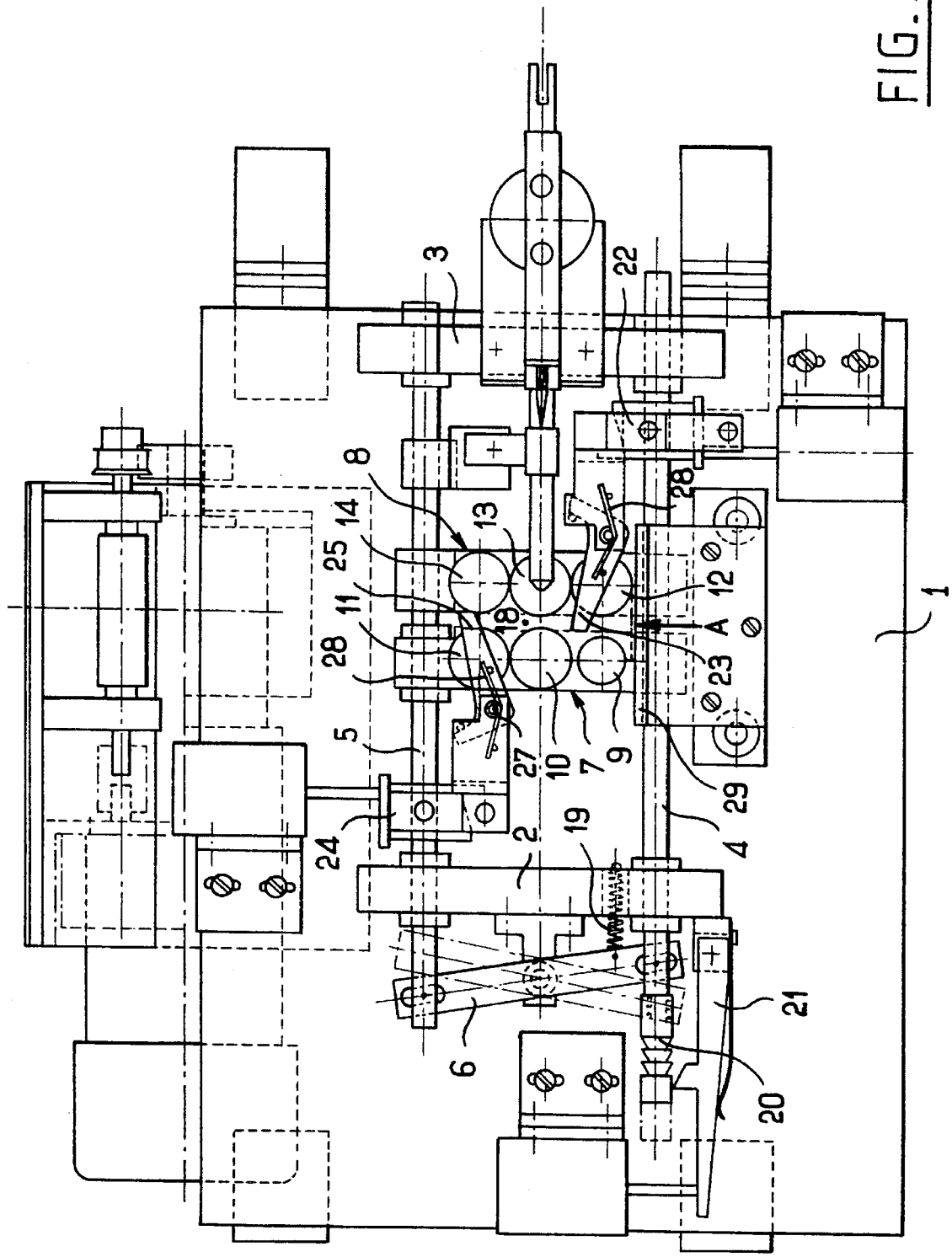
FIG. 2 is a plan view of the machine and in particular of the welding head that it uses.

The two groups of roller wheels 9, 10, 11 and 12, 13, 14 define between them a through path 18 of adjustable width. As shown in FIG. 2, the through path 18 is at its minimum width. If the crossbar 6 is pivoted clockwise about its pivot on the support 2, then the rod 5 is pushed to the right together with the block 8 that is coupled thereto, while the rod 4 is pulled to the left together with the block 7 which is coupled thereto. A spring 19 coupled between the support element 2 and the crossbar 6 urges the two blocks 7 and 8 towards each other so as to minimize the width of the path 18. In FIG. 2, the lefthand end of the rod 4 has a rack 20 suitable for co-operating with a catch lever 21 so as to oppose the drive from the spring 19 when the catch lever engages in one of the notches in the rack 20, thereby enabling the width of the path 18 to be maintained at a size greater than its minimum size. This disposition makes it possible to hold the path 18 at its maximum width so as to facilitate inserting the bundle to be sheathed between the two groups of wheels, and once the bundle has been inserted, the rod 4 can be released, thereby enabling the spring 19 to cause the wheels; to exert constant pressure on the bundle, regardless of the size of the bundle.

A support 22 is also secured to the rod 4 for an upper guide 23 that extends over the first wheel 12 and over the through path 18. It will be understood that this guide which is secured to the rod 4 remains stationary relative to the block 7 and thus extends over the entire width of the path 18 whatever that width may be.

Similarly, a support 24 for another upper guide 25 is secured to the rod 5, the guide 25 extending over the wheel 11 carried by the block 7.

Each of the guides 23 and 25 is constituted by a horizontal finger carrying a downwardly-extending end catch 26, the finger being pivoted to the corresponding support 22 or 24 about a vertical axis 27 so as to enable it to retract when a rigid obstacle travelling along the path 18 and projecting above the level of the wheels 9 to 14 goes past, where such an obstacle may be a branch of the bundle. Such retraction thus takes place about the axes 27 against respective return springs 28 for returning each guide to its position where it extends over the through path 18.

The direction in which a bundle to be sheathed travels between the two blocks of wheels is indicated by arrow A in FIG. 2, with the inlet wheels thus being the wheels 9 and 12. Upstream from these inlet wheels, the machine includes a guide 29 having a V-shaped opening 30 serving to raise each of the edges of a tape of sheathing material 31 that is inserted on the through path in direction A. The guide 29 includes a tongue 32 extending between the wheels 9 to 14 and forming the bottom of the through path 18.

FIG. 3 shows this tongue 32 as being inclined so that the driving action of the wheels on the bundles 33 passing along the path 18 includes a helical component tending to press the tape 31 around the thread-like elements making up the bundle 33 to be sheathed and that are placed in the path 18 and are received in the bottom of the V-shape formed by the tape 31 whose edges are raised by the guide 29. Naturally, the tongue 32 could extend horizontally between the wheels if this effect of tightening the sheath around the bundle 33 of thread-like elements is not desired.

The height of the tongue 32, and thus of the bottom of the through path 18, may be adjusted automatically as a function of the width of the through path. To this end, the guide 29 may be vertically adjustable, e.g. by means of camming surfaces 34 (oblique slots) co-operating with positioning studs 35 secured to the wheel-support blocks 7 and 8 so that moving the blocks apart causes the guide 29 to be moved downwards relative thereto.

Between the two horizontal guides 23 and 25, the welding head comprises a hot air blast nozzle 36 disposed above the wheels and shown in section in FIG. 5. The nozzle 36 includes a first vent 37 suitable for being closed to a greater or lesser extent by a piston 38 depending on how far the piston is engaged in the nozzle 36, and a second vent 39 suitable for being closed to a greater or lesser extent by a sleeve 40 that is likewise displaceable along the nozzle 36. The hot air feed for the nozzle 36 comes from a chamber 41 at the outlet from a constant flow source. The chamber 41 communicates with the inside of the nozzle 36 via an orifice 42, so the first vent 37 constitutes a diversion path for the hot air before it even enters the orifice 42. The position of the piston 38 may be servo-controlled to the speed at which the bundle is being driven, i.e. to the speed of rotation of the drive means 17, whereas the position of the sleeve 40 may either be a position for closing the vent 39 or else a position for opening said vent completely, depending on whether or not a branch 43 is detected on the path 18 where the bundle passes between the wheels.

It will also be observed that in order to disengage the path 18 completely so as to provide access to said path from above even at the guides 23 and 25, the supports 22 and 24 for said guides are made up of two portions that are hinged to each other about respective horizontal axes 44 enabling the guides 23 and 24 to be tilted away from the path 18 about said axes 44 against respective return springs 45 tending to put the guides 23 and 25 above the path 18.

In order to sheath a bundle 33 of thread-like elements by means of tape 31 wrapped around the bundle so that its edges are united, the method of the invention is as follows.

The end of the tape 21 is engaged in the guide V-shape 29 after the guide blocks 7 and 8 have been moved apart and the horizontal guides 23 and 25 have been raised by tilting their supports about the axes 44. The end of the bundle 33 to be sheathed is placed in the V of tape as formed in this way and which extends at least as far as the first pair of wheels 9 and 12, after which the wheels are urged against the sides of the V-shape and the horizontal guides 23 and 25 are brought back down over the through path 18. Depending on the number and the diameter of thread-like elements that are to be sheathed, the section of the bundle may vary between extreme sizes (e.g. 8 mm and 32 mm) as shown in FIGS. 4A–4F. Naturally, the width of the tape is adapted to the size of the bundle 33 to be sheathed. FIG. 4A shows the position taken by the tape and by the bundle beneath the guide 23 which serves to fold one of the sides of the tape V-shape over the bundle. The wheels 10 and 13 situated in the center of the welding head allow access to the inside of the groove (or pseudo-groove) formed by the two edges 31a and 31b of the tape, one of which edges is folded down on the bundle while the other edge extends up the wheel 10. The nozzle 36 blows hot air into the angle of this groove for the purpose of partially melting the outside surface of the edge 31a and the inside surface of the edge 31b. Under drive from the wheels, the bundle continues to move so as to reach the third set of wheels 11, 14, where the bundle passes beneath the second horizontal guide 25 which serves to fold the edge 31b down against the edge 31a so that their facing and partially-melted surfaces are welded together.

If the bundle 33 has a branch 43, then the branch is guided so as to extend vertically upwards between the wheels of the welding head, and while the branch 43 is going through, firstly the sleeve 40 opens the vent 39 so as to divert a major portion of the hot air that would otherwise be blown against the bundle, and secondly the branch acts mechanically on the horizontal guides 23 and 25 which retract in a horizontal plane about their respective axes 27 against their return springs 28. Once the branch 43 has gone through, the guides return to their original positions, and tubular sheathing can continue on the non-branching portion that follows the branch.

In an automated version of the machine, it is quite possible to ensure that detection of a branch in the vicinity of the drive wheels serves, for example, to slow down the drive speed and thus cause the piston 38 to be displaced so as to open the vent 37 to a greater or lesser extent, thereby diverting a portion of the hot air flow used for partially melting the edges of the tape. Once the branch has gone past, drive speed can return to a higher value and the hot air blast rate can be restored.

With the machine of the invention and in application of the method of the invention, a complex bundle is processed by successively sheathing first a main branch, and then each of the branches branching therefrom.. The bundle provided by the invention naturally has zones that are uncovered at the location of each junction point, but this does not degrade the qualities desired from a sheathed bundle. Nevertheless, it is possible to patch the bundle manually so as to close up the non-sheathed gaps, but this increases manufacturing costs.

The machine of the invention has been described in the context of an installation that is stationary, with the bundle being driven through it. It is quite possible, without going beyond the scope of the invention, for the welding head to be carried by a hand tool that is displaced along a cable bundle which is held stationary via its ends and also at certain other locations, in particular in the vicinity of its junction points.

We claim:

1. A method of manufacturing a bundle of tubes or electric cables of finite length, in which the bundle includes at least one junction point for a branch, and in which the tubes or electric cables of the bundle are enveloped in a plane thermofusible insulating material that is wrapped transversely about the elements and that has its longitudinal edges united by welding performed by application of heat, except at locations of junction points with each branch, the method being characterized in that each branch of the bundle is sheathed in succession by means of a respective tape that is wrapped transversely and is closed around the tubes or electric cables constituting the branch except at the location of a part of said branch which is adjacent to a respective one of the junction points.

2. A method according to claim 1, characterized in that the heat for welding is provided by blowing hot air against an outside face of one margin of the tape and against an inside face of an opposite margin while said margins are moving past a flow of hot air and while they are being held so as to form a groove, welding subsequently consisting in pressing one of the margins heated in this way against the other.

3. A method according to claim 2, characterized in that the heat applied is regulated by diverting an adjustable fraction of the flow of hot air that would otherwise be directed into an angle of the groove.

4. A method according to claim 3, characterized in that whenever a branch goes past, additional hot air is diverted.

5. A machine for manufacturing a bundle of tubes or electric cables of finite length, the bundle including at least one junction point for a branch, and the elements of the bundle being covered in a tape of thermofusible insulating material wrapped transversely around the bundle with longitudinal edges of the tape being united by welding, the machine being characterized in that it includes a welding head comprising two rows each of a plurality of drive wheels for driving the bundle and the tape against which the wheels bear, a V-shape previously being imparted to the tape by a guide situated upstream from said wheels, said rows of wheels defining between them a through path for the bundle, which path is upwardly open and passes successively beneath a first horizontal guide for folding down a first side of the V-shape against the bundle, beneath a nozzle for blowing hot air into an angle formed between the folded-down first side and a non-folded-down second side of the V-shape, and beneath a second horizontal guide for folding down the second side of the V-shape against the already folded-down first side.

6. A machine according to claim 5, characterized in that the horizontal guides are retractable when branches of the bundle go past, the guides being retractable against return members tending to keep them in an operating position.

7. A machine according to claim 5 characterized in that a width of the through path for the bundle is adjustable, each row of wheels being secured to a respective support block that is displaceable transversely relative to the through path of the bundle against a return member tending to minimize the width of the through path.

8. A machine according to claim 5, characterized in that the through path is delimited by a bottom that slopes relative to the direction of the wheel axes.

9. A machine according to claim 5, characterized in that the upstream guide for imparting a V-shape to the tape is adjustable in height as a function of the width of the through path.

10. A machine according to claim 5, characterized in that the first and second horizontal folding-down guides are retractable between their operating positions over the through path for the bundle and positions that disengage top access to the path for insertion of a new bundle to be sheathed.

11. A machine according to claim 5, characterized in that the hot air blast nozzle includes a vent outlet upstream from its end over the through path, the section of the outlet being adjustable as a function of the speed at which the bundle is driven by the wheels.

12. A machine according to claim 5, characterized in that the hot air blast nozzle includes a vent outlet upstream from its end over the through path, with the section of said outlet being opened or closed depending on whether a branch of the bundle is present or absent in the through path.

* * * * *